May 21, 1935.   E. C. DOMM   2,002,262
RUBBER COATED OBJECT
Filed April 16, 1934
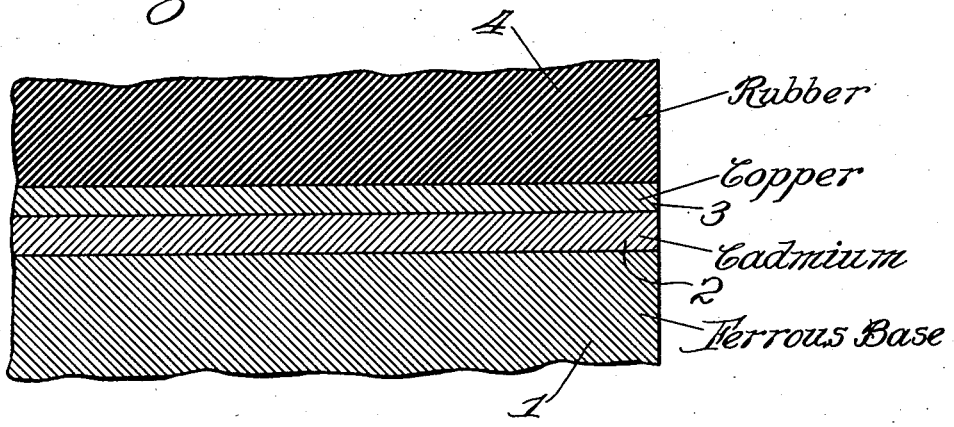
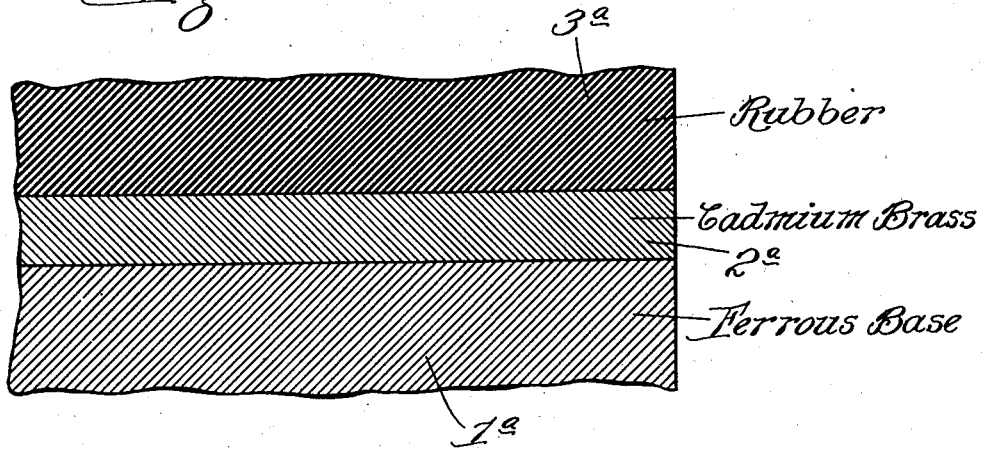

Patented May 21, 1935

2,002,262

UNITED STATES PATENT OFFICE 2,002,262

RUBBER COATED OBJECT

Elgin Carleton Domm, Niles, Mich., assignor to National-Standard Company, Niles, Mich., a corporation of Michigan Application April 16, 1934, Serial No. 720,890

17 Claims. (Cl. 18—53)

This invention relates to a rubber-coated steel object and particularly to flexible rubber-coated steel objects.

It has heretofore been known that ferrous-base objects could be coated with brass and then vulcanized directly to rubber. It has now been discovered that objects in general may be plated with an alloy of cadmium and copper, which is herein denoted as "cadmium brass", and is likewise adherent to rubber.

It has also been discovered that the effect is substantially the same whether the material is applied as an alloy, or if the cadmium is first applied and then a thin layer of copper is plated upon it. The copper and cadmium will apparently alloy in the course of time, or else in the vulcanizing operation, so that the bond is as good as where an alloy is applied in the first instance. Moreover, in connection with flexible metallic articles or articles of small cross-section, it is impracticable to dip the articles in molten brass, and the electroplating of brass is quite difficult, particularly in a continuous operation where strict uniformity is necessary.

The invention is illustrated diagrammatically in the drawing, in which Fig. 1 shows a broken sectional view of a base 1; 2 indicates a coating of cadmium thereon; 3, a thin layer of copper upon the cadmium, and 4, a rubber coating on the surface. Fig. 2 shows a similar base 1ª with a cadmium brass coating 2ª and a rubber layer 3ª thereon.

An example of the process of the invention will be given in connection with steel tire bead reenforcing wires having a diameter of .037 to .043 inch. These wires have a typical composition as follows:

| | Percent |
|---|---|
| Carbon | .65 |
| Manganese | .80 |
| Phosphorous | .015 |
| Sulphur | .025 |
| Silicon | .095 |

The balance is iron with traces of impurities.

The wires may be fed continuously from swifts, or the like, through the entire system. They are first cleansed by scraping and then wiping with rags soaked in a grease solvent, such as gasoline. They are then further cleansed by passing through a bath of hydrochloric acid, preferably containing about 10% HCl. The excess acid is removed by wet rags, and the wires are then passed through a water bath. They are again passed through acid, this time about 8% HCl and are again wiped and washed. The number and extent of these cleansing treatments depends, of course, upon the original condition of the wire.

The wires, when thoroughly clean, are drawn through a flux, the excess solution is removed by a rag wipe, and the wires then drawn through a bath of molten cadmium.

The temperature of the cadmium bath is particularly important in connection with the tire bead reenforcing wires. The bath must not be so hot as to injure the physical characteristics of the wire. It has been found that by proper adjustment of the temperature of the bath the wire may actually be improved. For example, it is desirable that tire bead wires should have a rather high limit of elongation and elasticity. As produced, such wire ordinarily has an elongation limit of ¼ to 1½%. By maintaining the bath at proper temperatures, this may be considerably increased. For example, with wires of .037 to .043 inch in diameter, an immersion of 1 to 5 seconds in a bath held at 820 to 840 degrees F. may cause an increase in elongation limit from ¼ to 1½% in the original wire to 2¾ to 5% after treatment. At the same time the elastic limit of the wire may be increased from 65 to 85%. For example, the wire may be passed through a 3 to 15 foot bath of cadmium at 180 feet per minute, the bath being maintained at 840 degrees F.

The steel article acquires a cadmium coating approximately 1/4000ths to 1/11,000ths of an inch in thickness. For example, with wire of .043 inch diameter, weighing 4.88 lbs. per 1000 feet of wire, the weight of the cadmium is about 8 to 20 grams per kilogram of wire. With .037 inch diameter wire, weighing 3.61 lbs. per 1000 feet, the weight of the cadmium is about 10 to 24 grams per kilogram.

The cadmium alloys itself with the iron to some extent, so that about 10 to 25% of the cadmium coating is iron. This results in a better bonding than where the cadmium is applied electrolytically.

The wires are then washed in warm water and passed into a copper plating bath. The plating is preferably carried out by the cyanide process, using a solution containing 4½ oz. of sodium cyanide, 3 oz. of copper cyanide, 2 oz. of sodium carbonate and ¼ oz. sodium hyposulphite per gallon. Generally several consecutive plating baths are used. At each end of the plating tanks the wire is fed over copper rolls to which a low voltage direct plating current is supplied in sufficient amperage and voltage to plate the wire. A normal current density is 30 amperes per square foot.

The electrolyte is continuously circulated, and a portion thereof is continuously removed from the tank, warmed to about 120° F. and replaced. This flow of electrolyte is particularly advantageous in removing gas bubbles.

Copper is applied at the rate of 0.5 to 1.3 grams per kilogram of wire. The proportion of cadmium to copper is therefore from 6 to 30 parts of cadmium to one part of copper.

The weight of 0.5 gram of copper per kilogram of .043 inch diameter tire bead wire is equivalent to a thickness of approximately 1/240,000 inch of the metal on the average. This amount is equivalent to a weight of approximately 0.1 gram of copper per square foot of surface. Copper thicknesses up to about 1/66000 inch will alloy throughout in commercial periods.

After leaving the plating bath the wires are washed with water, first cold and then hot, and are then air dried.

After the steel articles have been cadmium and copper plated, they may be coated with rubber and the rubber vulcanized directly thereto in accordance with known practice.

Other rubber adhesion increasing coating such as antimony may, of course, be added if desired. Likewise, other substances may be added to the cadmium to give particular qualities in the finished product.

The coating of cadmium lessens or prevents corrosion of the material to which it is applied; and the copper alone, or alloyed with the cadmium, increases the bonding or adhesion to rubber when the article is employed in rubber.

The cadmium brass may of course be applied as an alloy in the first instance either by applying the molten alloy or by electroplating under carefully controlled conditions. Any ferrous-base object may be used, whether wire strip or bulky object.

Where the cadmium and copper are applied separately, the copper layer should be thin enough so that the cadmium will penetrate to the surface of the copper and form a layer adherent to rubber.

In addition to ferrous base objects, any other platable surface may be used as a base. Preferably the surface is metallic, but non-metallic surfaces may be plated with a metal, as by dipping or spraying, and then plated with cadmium and copper, and one or both of the latter may be applied directly to the object. For example, wood and ceramic materials may be so treated.

Cadmium as used herein refers to the pure metal and also to alloys of cadmium. An alloy of zinc and cadmium may frequently be used.

The foregoing detailed description has been given for clearness of understanding only, and no unnecessary limitations should be understood therefrom, but the appended claims should be construed as broadly as permissible, in view of the prior art.

What I claim as new and desire to secure by Letters Patent is:

1. In the production of rubber coated ferrous base articles, the step of producing a cadmium brass coating by separately coating said article with a thin coating of cadmium, and a layer of copper having a thickness less than approximately 1/66,000 inch and of a thickness to alloy throughout with the cadmium at atmospheric temperature or at the temperature of vulcanization and produce a thin layer of cadmium brass thereon, and vulcanizing a coating of rubber thereon.

2. The method as set forth in claim 1 in which the cadmium coating has a thickness of the order of 1/4000 to 1/11,000 of an inch.

3. The method as set forth in claim 1 in which the copper has a thickness of the order of 1/240,000 inch to 1/66,000 inch.

4. The method as set forth in claim 1 in which the cadmium coating has a thickness of the order of 1/4,000 to 1/11,000 inch, and the copper has a thickness of the order of 1/66,000 to 1/240,000 inch.

5. The method as set forth in claim 1 in which the cadmium is alloyed with the ferrous base at the point of contact.

6. The method as set forth in claim 1 in which alloying is completed during vulcanization.

7. A rubber coated article comprising a ferrous metal base, a cadmium coating over said base, a thin copper coating thereon having a thickness less than approximately 1/66,000 inch and of a thickness to alloy throughout with the cadmium at atmospheric temperature or at the temperature of vulcanization, and produce a thin layer of cadmium brass thereon, and a coating of rubber vulcanized thereon.

8. An article as in claim 7 in which the cadmium has a thickness of the order of 1/4000 to 1/11,000 inch.

9. An article as in claim 7 in which the copper has a minimum thickness of the order of 1/240,000 inch.

10. An article as set forth in claim 7 in which the cadmium has a thickness of the order of 1/4,000 to 1/11,000 of an inch, and the copper has a minimum thickness of the order of 1/240,000 inch.

11. An article as set forth in claim 7 in which the cadmium has a thickness of the order of 1/4,000 to 1/11,000 of an inch, and the copper has a thickness of the order of 1/100,000 of an inch.

12. A ferrous base article, having a layer of cadmium at a surface, the thickness of cadmium being of the order of 1/4,000 to 1/11,000 inch, and a thin copper layer on the cadmium, said layer of copper having a thickness less than approximately 1/66,000 of an inch and of a thickness to alloy throughout with the cadmium at atmospheric temperature or at the temperature of vulcanization and produce a thin layer of cadmium brass thereon, said article being adapted for adherent vulcanization to rubber.

13. A ferrous base article adapted for adherent vulcanization to rubber, comprising a ferrous base, a layer of cadmium thereon, the total thickness of cadmium on the base being of the order of 1/4,000 to 1/11,000 inch, and a copper layer adapted to alloy with the outer surface of the cadmium, and of a thickness of the order of 1/66,000 to 1/240,000 of an inch, whereby the copper and cadmium form a thin layer of rubber adherent cadmium brass at atmospheric temperature or the temperature of vulcanization.

14. An article as set forth in claim 12 in which the copper has a weight of the order of .1 to .4 gram per square foot of surface.

15. A ferrous metal tire bead wire having high elasticity and elongation limits and of a thickness of the order of .037 to .043 inch and adapted to be adherently vulcanized to a tire bead, having a wiped galvanized layer of cadmium thereon, and a layer of copper thereon having a weight of the order of .1 to .4 gram per square foot of wire, whereby the copper and cadmium form a thin layer of rubber adherent cadmium brass at atmospheric temperature or the temperature of vulcanization, whereby during vulcanization of the wire to the tire bead the rubber adheres to the formed cadmium brass layer.

16. A ferrous base article adapted for adherent vulcanization to rubber and consisting of a ferrous base portion, a cadmium iron alloy layer merging into a surface of the ferrous base portion, a cadmium layer merging into the cadmium iron alloy layer, the cadmium and alloy layer together being of the order of 1/4,000 to 1/11,000 inch thick, an outer thin layer of copper not over approximately 1/66,000 inch thick and thick enough to form a rubber adherent layer of cadmium brass at a temperature not higher than that of vulcanization, whereby during vulcanization to the article of a rubber layer the latter is bonded to the zinc by the cadmium brass layer.

17. The product of claim 16 in which the article is a tire bead wire, and the several metallic layers surround all the wire surface.

ELGIN CARLETON DOMM.